United States Patent [19]

Drevet et al.

[11] 4,417,823

[45] Nov. 29, 1983

[54] HYDROSTATIC GUIDE BEARING OF A SEAT

[75] Inventors: Michel Drevet, Lyons, France; Jean Trouillet, Fontaine-Valmont, Belgium

[73] Assignee: Jeumont Schneider Corporation, Puteaux, France

[21] Appl. No.: 281,190

[22] PCT Filed: Nov. 17, 1980

[86] PCT No.: PCT/FR80/00163

§ 371 Date: Jul. 6, 1981

§ 102(e) Date: Jul. 6, 1981

[87] PCT Pub. No.: WO81/01449

PCT Pub. Date: May 28, 1981

[30] Foreign Application Priority Data

Nov. 20, 1979 [FR] France .................... 79 28524

[51] Int. Cl.³ .............................................. F16C 32/06
[52] U.S. Cl. .................................... 384/115; 384/111; 384/113; 384/118

[58] Field of Search ................ 308/9, DIG. 1, 240, 308/122, 170, 5 R; 384/115, 118, 120, 111, 113, 114, 107

[56] References Cited

U.S. PATENT DOCUMENTS 2,811,109 10/1957 Brill et al. .
4,330,159 5/1982 Kakimoto ............................ 308/9

FOREIGN PATENT DOCUMENTS 2235458 1/1975 France .

Primary Examiner—Lenard A. Footland
Attorney, Agent, or Firm—Rines and Rines, Shapiro and Shapiro

[57] ABSTRACT

This disclosure is concerned with improvements in hydrostatic guide bearings of a shaft in which the journal of the shaft takes on the form of a sleeve and the bearing comprises a first and a second set of chambers placed within concentric races respectively opposite the internal and external walls of the journal.

13 Claims, 3 Drawing Figures

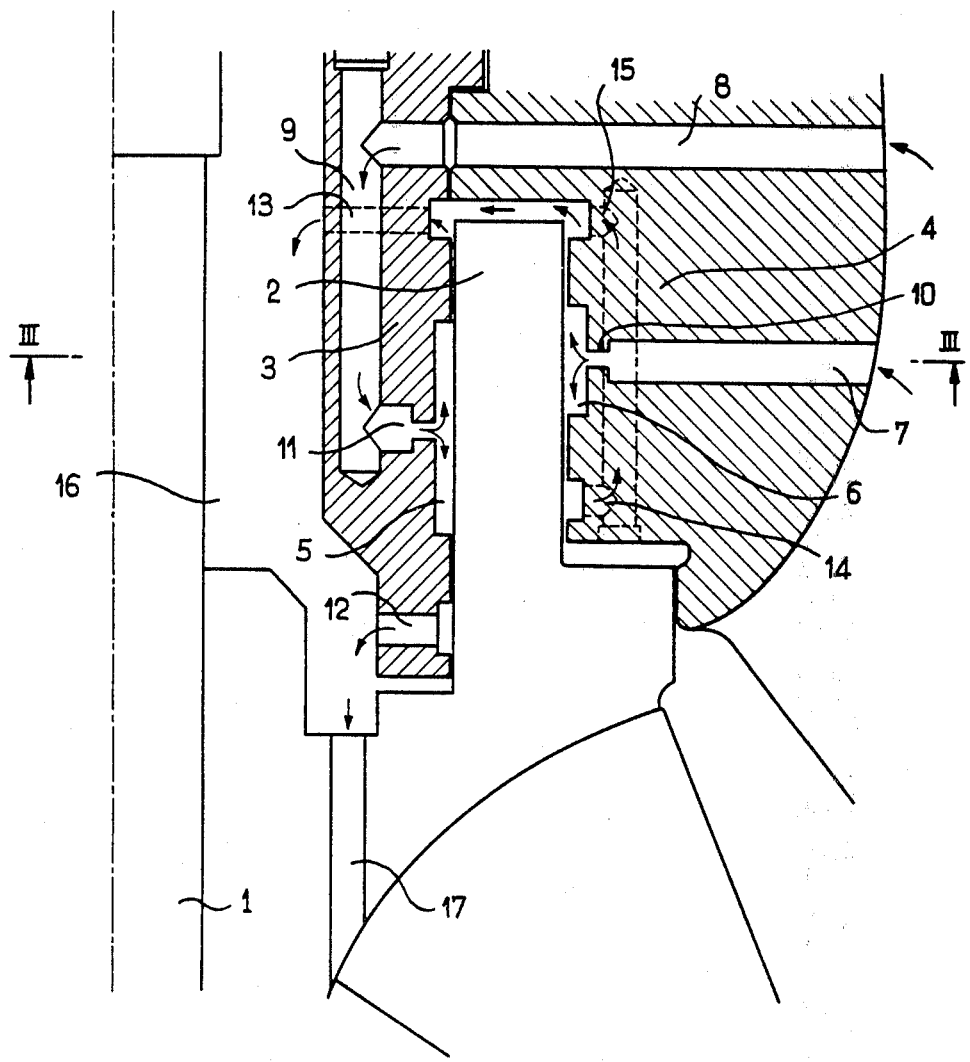
FIG_1

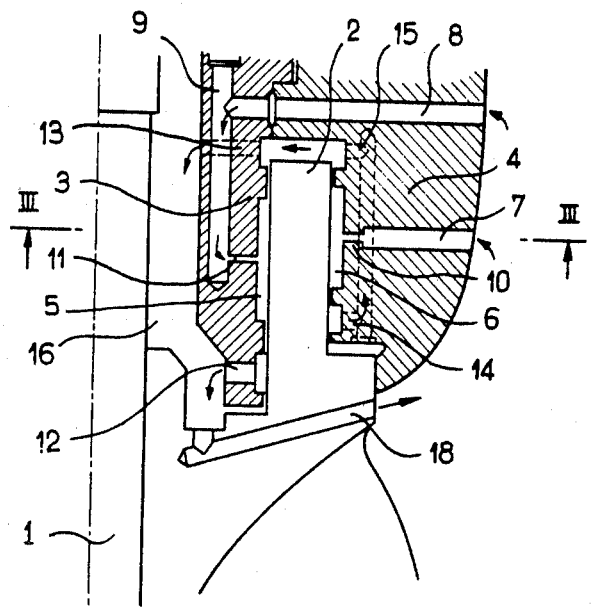
FIG_2
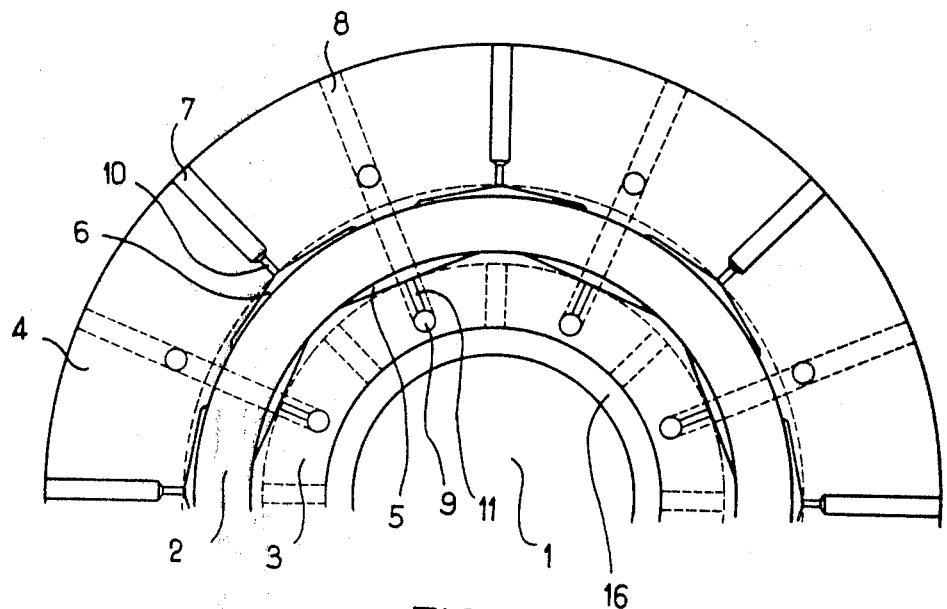
FIG_3

HYDROSTATIC GUIDE BEARING OF A SEAT

The present invention concerns hydrostatic guide bearings of a shaft, the journal of which is in the form of a sleeve, and a fluid pump for the realization of such a bearing.

Hydrostatic guide bearings are quite familiar to those in this art. They are generally defined according to the number of chambers disposed within the race concentrically surrounding the rotating journal of the shaft. A viscous fluid under pressure is admitted into the chambers to limit the friction between the journal and the race, and it leaves through openings provided for this purpose in the race at a certain distance from the chambers.

The axial length of the journal is sufficiently great with respect to the length of the shaft so that the line of the shaft will have a satisfactory dynamic behavior, and, in particular, so that the vibration level of the assembly will be less than a given threshold.

The present invention has as its object a hydrostatic guide bearing having the same goals, but whose journal has a smaller axial length.

According to the invention, in summary, the journal of the shaft takes on the form of a sleeve, and the bearing comprises a first and a second set of chambers placed within concentric races respectively opposite the internal wall and the external wall of the journal.

Toward the goal of improving the characteristics of operation of the bearing conforming to the invention, the chambers of the first set may be suitably displaced with respect to the chambers of the second set, both angularly and axially.

Such a bearing is intended particularly for guidance of the shaft of a fluid pump, for example a primary pump of a nuclear reactor. In this case, it is advantageous to draw the working fluid of the bearing from the pumped fluid, downstream of the pump, admitting ducts then being capable of directing the working fluid in a centripetal direction.

The invention will be better understood, and other goals, advantages and characteristics will appear more clearly from the reading of the description which follows of an example of realization of the invention, to which description are appended two figures of drawings.

FIG. 1 represents, in partial axial cutaway, a hydrostatic bearing conforming to the present invention.

FIG. 2 represents, in partial axial cutaway, a variation of the mode of realization represented in FIG. 1 of a hydrostatic bearing conforming to the present invention, and FIG. 3 represents, in partial transverse cutaway along the line III—III of FIGS. 1 and 2, a preferred angular arrangement of the various chambers of the bearing.

Referring to FIG. 1, in which only a partial cross-section of a hydrostatic bearing has been represented because of the axial symmetry of the assembly, the shaft 1 is integrally attached to the sleeve 2 forming a journal for the bearing. The bearing comprises two concentric races 3 and 4 in which are disposed two sets of chambers 5 and 6. These chambers are respectively opposite the internal wall and the external wall of the sleeve 2.

The admission of the viscous fluid is attained by aid of the ducts 7, 8 and 9, with nozzles 10, 11 being provided between each admission duct and the corresponding chamber. The viscous fluid circulates because of the pressure from the chambers toward outlet ducts, between the wall of the journal and that of the race. Outlet ducts 12, 13 and 14, 15 are provided on one side and the other of the corresponding chamber 5, 6, in order to conduct the used fluid to a collector 16.

In the example represented, which is that of a fluid pump, the viscous fluid circulates in a centripetal fashion, with the collectors 16 disposed between the shaft 1 and the sleeve acting as a journal 2. However, this arrangement could be reversed.

In the example of a fluid pump, the viscous fluid used is advantageously constituted by the pumped fluid with admission ducts 7, 8 having their open end downstream of the pump; that is, in the portion where the fluid is under pressure.

In circulating within the bearing, the fluid depressurizes, and the collector 16, connected to a duct 17, releases the fluid upstream of the pump, that is, in the zone where the fluid has not yet been pumped, and where it is thus at a lower pressure than downstream.

For this reason, to reduce the loss of yield of the pump, the arrangement of FIG. 2 may be preferred, in which the collector 16 is connected to the duct 18 whose centrifugal orientation makes it possible to return the fluid used in the bearing downstream, that is, in the zone where the fluid is under pressure.

The hydrostatic guide bearing according to the invention makes it possible to reduce significantly the axial length of the journal while maintaining the characteristics of the bearing. Furthermore, such a bearing makes it possible to improve the dynamic behavior of the shaft line, and, consequently, to increase the value of its critical velocity of flexing while reducing the vibration level of the assembly.

In the application to primary pumps for a nuclear reactor, the viscous fluid is at a high temperature. For this reason, a supply failure or the rupture of the thermal barrier does not affect the functioning of such a bearing.

However, to improve the performance characteristics of this bearing, it is possible to optimize the uniformity of its support, as represented in FIG. 3, with the same reference numbers, by means of an angular displacement of the chambers of one race with respect to the chambers of the other race, and/or, as represented in FIGS. 1 and 2, by means of an axial displacement of the chambers on one race with respect to the chambers of the other race. This double displacement has the result of significantly reducing the effect of pulsation in the bearing.

Although only preferred modes of realization have been described, it is evident that any modification brought about by those in this art within the spirit of the invention will not constitute a departure from the framework of the present invention. Furthermore, the application of such a bearing is not limited to fluid pumps, but rather extends to all rotating machines, with shafts horizontal, vertical or inclined.

We claim:

1. Hydrostatic guide bearing for a shaft having a journal in the form of a sleeve, characterized in that the bearing comprises a first and a second set of chambers disposed in concentric races respectively opposite the internal wall and the external wall of the said journal, and that the chambers of the said first set are angularly displaced with respect to the chambers of the said second set.

2. Bearing according to claim 1, characterized in that the chambers of the said first set are displaced axially with respect to the chambers of the said second set.

3. Bearing according to claim 1 for a fluid pump, characterized in that fluid is drawn downstream of the said pump for use as the working fluid in the said bearing.

4. Bearing according to claim 3, characterized in that admission ducts of the said chambers direct the said fluid in a centripetal direction.

5. Bearing according to claim 4, characterized in that an outlet collector of the said fluid is constituted by a space between the said journal and the said shaft (1).

6. Bearing according to claim 5, characterized in that an outlet duct connects the said collector (16) to the section upstream of the said pump.

7. Bearing according to claim 5, characterized in that a centrifugal outlet duct connects the said collector to the section downstream of the said pump.

8. Hydrostatic guide bearing for a pump shaft comprising a journal in the form of a sleeve, a first and a second set of chambers disposed in concentric inner and outer races respectively opposite the internal wall and the external wall of said journal, and means for utilizing fluid pumped by the pump as working fluid for the bearing including admission ducts for delivering working fluid to said chambers from the high-pressure side of the pump, an outlet collector for said fluid, and an outlet duct connecting said collector to the low-pressure side of the pump.

9. Bearing according to claim 8, wherein said admission ducts are disposed for directing the fluid in a centripetal direction.

10. Bearing according to claim 8, wherein said outlet collector is constituted by a space formed between the inner race and said shaft.

11. Bearing according to claim 8, wherein the outlet duct is adapted to direct the fluid in a centrifugal direction.

12. Bearing according to claim 8, wherein the chambers of said first set are angularly displaced with respect to the chambers of said second set.

13. Bearing according to claim 8, wherein the chambers of said first set are displaced axially with respect to the chambers of said second set.

* * * * *